United States Patent
Strachan et al.

(10) Patent No.: US 10,860,464 B2
(45) Date of Patent: Dec. 8, 2020

(54) TEST SELECTION FOR APPLICATION COMMIT

(71) Applicant: Hewlett Packard Enterprise Development LP, Houston, TX (US)

(72) Inventors: Shaul Strachan, Yehud (IL); Sigal Ishay, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 301 days.

(21) Appl. No.: 15/455,964

(22) Filed: Mar. 10, 2017

(65) Prior Publication Data

US 2018/0260312 A1    Sep. 13, 2018

(51) Int. Cl.
G06F 11/36    (2006.01)
G06F 8/71    (2018.01)

(52) U.S. Cl.
CPC ............ *G06F 11/3688* (2013.01); *G06F 8/71* (2013.01); *G06F 11/3684* (2013.01)

(58) Field of Classification Search
CPC combination set(s) only.
See application file for complete search history.

(56) References Cited

U.S. PATENT DOCUMENTS

| | | | |
|---|---|---|---|
| 8,533,676 B2 | 9/2013 | Watters et al. | |
| 8,812,911 B2 | 8/2014 | Plamondon | |
| 9,378,124 B1* | 6/2016 | dos Santos | G06F 11/3688 |
| 2010/0114830 A1* | 5/2010 | Vanhove | G06F 17/30371 |
| | | | 707/641 |
| 2015/0026121 A1 | 1/2015 | Shani et al. | |
| 2015/0095619 A1* | 4/2015 | Dubey | G06F 11/3688 |
| | | | 712/216 |
| 2015/0355888 A1 | 12/2015 | Shani et al. | |
| 2015/0370554 A1 | 12/2015 | Benedict et al. | |
| 2017/0199737 A1* | 7/2017 | Bofferding | G06F 8/76 |

FOREIGN PATENT DOCUMENTS

CN    105138386 A    12/2015

OTHER PUBLICATIONS

Elbaum, S. et al., "Techniques for Improving Regression Testing in Continuous Integration Development Environments," (Research Paper), Nov. 16-22, 2014, 11 Pages, https://pdfs.semanticscholar.org/03df/6dcf76e5e7027c0138fe7844013e3dda540f.pdf.

* cited by examiner

*Primary Examiner* — Chat C Do

(57) ABSTRACT

Examples disclosed herein involve selecting tests for an application commit. In examples herein, a commit of an application code is detected based on a commit identifier in a request, the commit to update the application code, characteristics of the commit are determined from a repository of commit records; and tests for the commit are selected based on the characteristics of the application code to be executed to validate the updated application code.

20 Claims, 6 Drawing Sheets

TEST SELECTION FOR APPLICATION COMMIT

BACKGROUND

An application is developed through several iterations and changes to a code of an application. As the application code is edited or updated, a commit of the application code may be made that saves the state of the code. The application may be built from a commit of the application code.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve dynamically selecting tests to be executed on a commit of an application based on characteristics of the commit. For example, the tests may be selected based on the portion of the application code that is changed or updated (relative to a previous version of the application code), based on an execution history for a commit of the application code, based on the type of the commit, or any other suitable characteristics of the application commit that can be identified or maintained.

In many previous systems, validating a commit of an application code involves executing a same set of tests on the full application code. As such, there is an unnecessary amount of resources and time to validate a commit because many of the tests that are executed are not relevant to a commit (e.g., the tests are for areas of the application code that were not changed or updated in the commit). Additionally, in such systems, failure analysis from full tests of the application code may provide a complicated analysis of the impact of changes in the commit due to the amount of irrelevant testing. In many instances of these systems, test execution is performed through annotations in the application code which limits flexibility in testing and limits the test selection to those selected by developers of the application code. Furthermore, changing annotations within the application code (e.g., to add a test) may trigger an unnecessary build. Examples herein allow for dynamic selection of tests for an application code based on characteristics of a commit of the application code.

An example method disclosed herein includes detecting a commit of an application code based on a commit identifier in a request, the commit to update the application code; determining characteristics of the commit from a repository of commit records; and selecting tests for the commit based on the characteristics of the commit, the tests to be executed to validate the updated application code.

Figure 1:
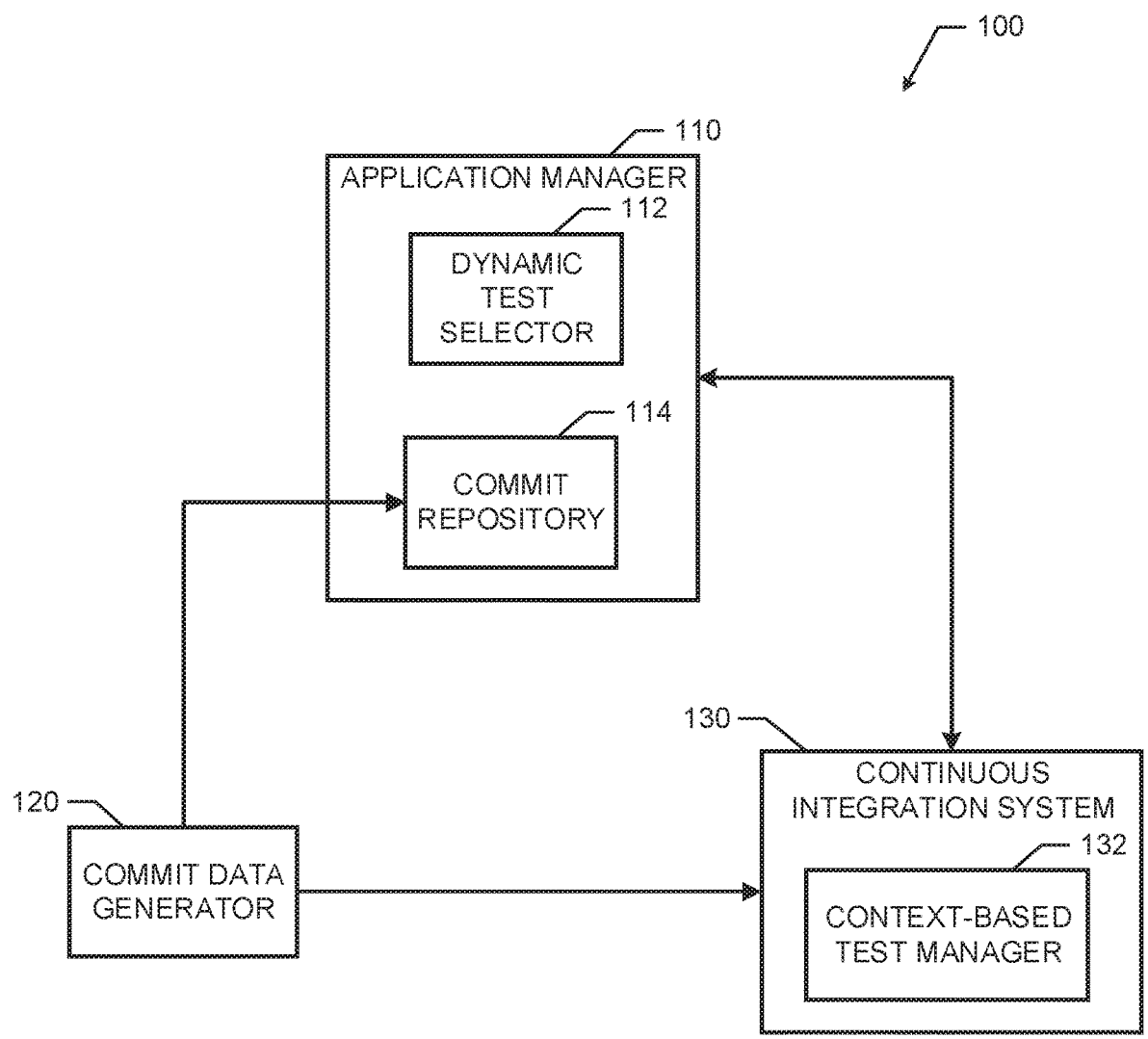
FIG. 1 illustrates a block diagram of an example application test system including an application manager with a dynamic test selector that may be implemented in accordance with an aspect of this disclosure.

FIG. 1 is a block diagram of an example application test system 100 including an application manager 110 with a dynamic test selector 112 implemented in accordance with examples herein. The example application test system 100 includes the application manager 110, commit data generator 120, and a continuous integration system 130. In examples herein, the commit generator 120 provides commit data to the application manager 110 for application management and the continuous integration system 130 for testing. The example dynamic test selector 112 of the application manager 110 selects tests for commits to be tested by the continuous integration system 130 based on information for the commits stored in a commit repository 114 of the application manager 110. The example continuous integration system 130 includes a context-based test manager 132 to manage received commits for context-based testing, requests tests to be executed from the application manager 110, and executes the received tests to validate the application code of the commit.

The example commit data generator 120 may be any user input device or user interface that facilitates the generation of commit data through editing code of an application. For example, the commit data generator 120 may be an interface that enables a user to create, edit, and update application code. As such, the commit data generator 120 may include a graphical user interface, communication interfaces with user input devices (e.g., a keyboard, a mouse, etc.), or any other suitable interfaces to enable the creation of commit data for commits of an application code. In examples herein, a commit represents an updated or changed state of an application code. As such, commit data is defined as data for the commit that includes an update or a change to an application code. In examples herein, when a change to the application code is committed (i.e., a commit of an application code is made), the commit data generator 120 provides the commit data to the application manager 110 for maintaining a commit record for the commit and the continuous integration system 130 for the testing (e.g., via a context-based test) the commit.

Upon receipt of commit data from the commit data generator 120, the application manager 110 stores the commit data and/or information (e.g., metadata) associated with the commit data within commit records of the commit repository 114. The example commit repository 114 may be implemented by any data structure (e.g., a table, a matrix, a task graph, etc.) that may store commit records that includes commit data and/or characteristics of commits. The commit repository 114 may store identification/relation information (e.g., a commit identifier such as a name, number, etc.) for commit records of commits, such that commit data corresponding to related commits, commit types, or a particular user can be stored together or identified as related to one another. Accordingly, the commit repository 114 can store a history of commits or relationships of commits of an application code for a particular update or project that represents a history of changes to the application code. In some examples, the commit repository 114 may store specific or designated tests that are to be run for certain commits, related commits, commit identifiers, or projects of commits. The example specific or designated tests may be specified via user input. In some examples, the specific or designated tests may be detected or identified based on the tests previously being selected for execution by the dynamic test selector 112 for a same or similar commit, project, update, or user that provided the commit. Furthermore, in some examples, commit repository 114 may receive characteristics of the committed change to the application from a user via a user interface of the application manager 110. Accordingly, when a new commit is received, a user may provide details about the commit (e.g., an area of code updated in the commit, test instructions for the commit, user information for the commit, etc.). In examples herein, the dynamic test selector 112 selects tests for commits to be executed by the continuous integration system 130 based on the information in the commit repository 114.

As mentioned above, the commit data generator 120 provides commits to the continuous integration system 130 for testing to validate the application code (i.e., to verify that the commit data does not include any errors or does not cause any regressions in performance of an application of the commit). Upon receipt of the commit data from the commit data generator 120, the continuous integration system 130 initiates a test build. The example continuous integration system 130 may be any application test system or build system that is capable of compiling the application code, deploying the compiled application code to an appropriate environment, and running tests on the application code in the appropriate environment. The continuous integration system 130 of FIG. 1 includes a context-based test manager 132 to perform context-based testing on commits of the application code using information from the dynamic test selector 112.

In examples herein, the context-based test manager 132 of the continuous integration system 130 requests the application manager 110 (e.g., via the dynamic test selector 112) to select and provide tests based on the context of the commit (rather than the continuous integration system 130 performing a full build of the application code of the commit with a set of pre-defined tests for the full build). For example, the context-based test manager 132 may provide a commit identifier in the request to the application manager 110. Based on the request, the dynamic test selector 112 of the application manager 110 selects tests based on content of the commit having the commit identifier in the commit repository 114 in accordance with examples herein. The dynamic test selector 112 replies to the request by indicating to the context-based test manager 132 the selected tests (and/or providing testing instructions for tests) that are to be executed. Based on the indicated tests received from the application manager 110, the context-based test manager 132 facilitates executing the selected tests for the commit data (rather than performing a full build of the application code from the commit data and performing a full test of the commit data).

In some examples, the context-based test manager 132 returns results of tests to the application manager 110. For example, the context-based test manager 132 may return result data associated with the selected tests. The example result data may include the information on the tests executed (e.g., environment, instructions, sequence/order, etc.), compilation or build results of the tests, user feedback from the tests, or errors detected from the tests. Such data may be stored in the commit repository 114 and further used for a subsequently received commit. Accordingly, the example results data may be stored in the commit repository as a characteristics of a subsequent related commit (e.g., a commit for a same project as a commit of the tested result data).

Accordingly, the example application test system 100 of FIG. 1 facilitates test selection for commits of an application code. Using the dynamic test selector 112, as described below in connection with FIG. 2, the application manager 110 can dynamically select tests for commits of an application based on the content of the commit. As such, the continuous integration system 130 may perform the selected tests, rather than a full build and testing of the application code, on the commit data for efficient testing of commits.

Figure 2:
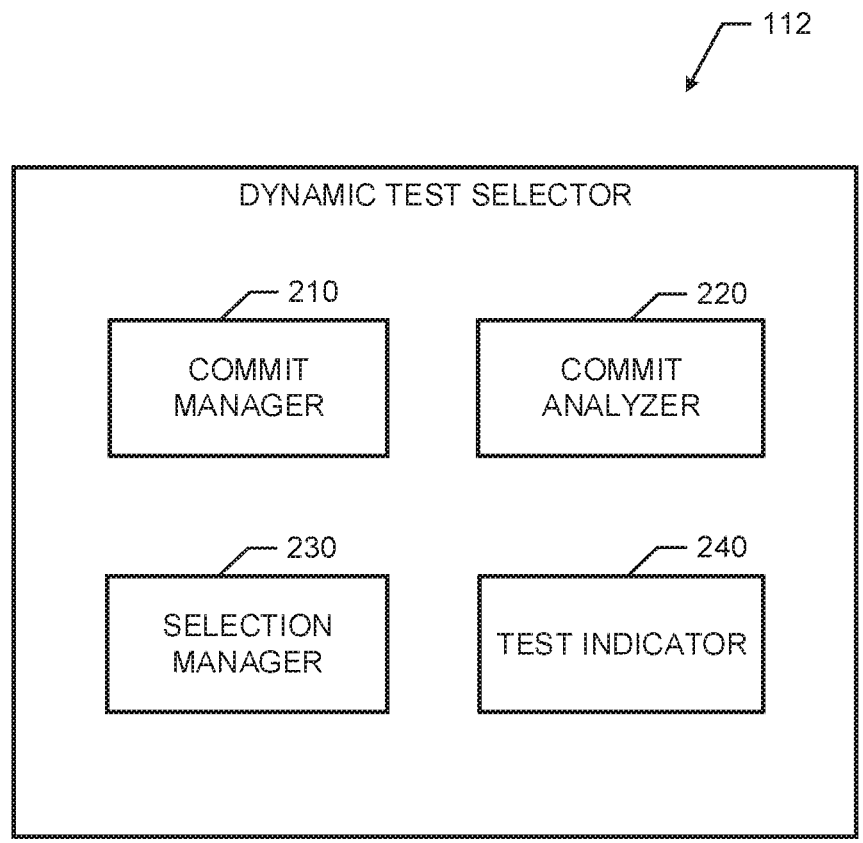
FIG. 2 is a block diagram of an example dynamic test selector that may be used to implement the dynamic test selector of FIG. 1 in accordance with an aspect of this disclosure.

FIG. 2 is a block diagram of an example dynamic test selector 112 that may be used to implement the dynamic test selector 112 in the application manager 110 of FIG. 1. The example dynamic test selector 112 of FIG. 2 includes a commit manager, a commit analyzer 220, a selection manager 230, and a test indicator 240. The example dynamic test selector 112 of FIG. 2 may be implemented to select tests based on content of a commit for execution by a continuous integration system in response to a request from the continuous integration system 130. In examples herein, the commit manager determines which commit is to be tested based on a commit identifier, the commit analyzer 220 determines characteristics of the commit (e.g., from the commit repository 114), the selection manager 230 selects tests for the commit based on the determined characteristics, and the test indicator 240 indicates tests that are to be executed by the continuous integration system 130 for the commit.

The example commit manager in FIG. 2 manages commit data and commit information for commits received by the application manager 110. The commit manager 210 may manage commit data for commits received from the commit data generator 120. For example, the commit manager 210 may store the commit data or characteristics of commits (e.g., commit identifiers, commit data, test result data, commit relation data, commit tags, etc.) in the commit repository 114. Furthermore, the commit manager 210 identifies a commit that is to be tested in a request received from the context-based test manager 132 of FIG. 1. When the dynamic test selector 112 receives a request for test selection from the continuous integration system 130, the commit manager 210 identifies the commit based on a commit identifier in the request. The example commit manager 210 may then cross-reference the commit repository 114 for an entry (or entries) for the commit identifier. The example commit manager 210 may then retrieve or extract information and/or commit data for the commit from entries in the commit repository 114 and provide the information and/or commit data to the commit analyzer 220.

The example commit analyzer 220 determines characteristics of the commit from the information and/or commit data retrieved by the commit manager. For example, the commit analyzer 220 may determine an area of code of the application that is to be tested, a type of the commit (e.g., a defect commit or user story commit), historical information about the commit (e.g., which tests have been executed in the past for the commit, etc.), features of the commit (e.g., particular characteristics of the commit, such as an area of the application code of the commit, type of the commit, etc.), tags in the commit from a user, information corresponding related entities of the commit, etc. The example commit analyzer 220 may determine such characteristics from characteristics fields storing the information in the commit repository 114.

The example selection manager 230 of FIG. 2 selects tests for a commit based on the characteristics determined by the commit analyzer 220. The selection manager 230 may utilize or implement a data structure (e.g., a table, an index, a task graph, etc.) of tests that are to be executed when commits have certain characteristics (e.g., certain user story commits, certain features of the commit, certain areas of the code changed in the commit, etc.). For example, the selection manager 230 may determine (e.g., from a data structure) that a particular set of tests are to be executed for a commit when a change is made to a certain area (e.g., application module) of the application code. In some examples, certain tests may be selected based on whether the commit is a user story commit or a defect commit and/or based on whether certain tests were performed for related commits (e.g., a commit associated with a same project or user). In some examples, certain tests may be selected based on previous tests being executed for a related commit. Further, the example selection manager 230 may select end-to-end (E2E)/sanity tests related to a particular application module that has been changed in the commit. Accordingly, the selection manager 230 may implement a coverage analysis to select tests for execution for a commit based on characteristics of the commit.

Once the selection manager 230 selects the appropriate tests for a commit, the example test indicator 240 indicates the selected tests that are to be executed by the continuous integration system 130. For example, the test indicator 240 may generate a message indicating which tests are to be executed. In some examples, the test indicator 240 may further include execution instructions for testing the commit using the selected tests. For example, the test indicator 240 may provide an order in which tests are to be executed defined by the tests selected by the selection manager 230, conditions for testing the commit, or any other suitable execution instructions. Accordingly, the test indicator 240 may serve as a response interface for the continuous integration system 130 that indicates/provides test information in response to the requested test selection from the continuous integration system 130.

While an example manner of implementing the dynamic test selector 112 of FIG. 1 is illustrated in FIG. 2, at least one of the elements, processes and/or devices illustrated in FIG. 2 may be combined, divided, re-arranged, omitted, eliminated and/or implemented in any other way. Further, the example commit manager, the commit analyzer 220, the selection manager 230, the test manager 240, and/or, more generally, the example dynamic test selector 112 of FIG. 2 may be implemented by hardware and/or any combination of hardware and executable instructions (e.g., software and/or firmware). Thus, for example, any of the commit manager, the commit analyzer 220, the selection manager 230, the test manager 240, and/or, more generally, the example dynamic test selector 112 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the commit manager, the commit analyzer 220, the selection manager 230, and/or the test manager 240, and/or is/are hereby expressly defined to include a tangible machine readable storage device or storage disk such as a memory, a digital versatile disk (DVD), a compact disk (CD), a Blu-ray disk, etc. storing the executable instructions. Further still, the example dynamic test selector of FIG. 2 may include at least one element, process, and/or device in addition to, or instead of, those illustrated in FIG. 2, and/or may include more than one of any or all of the illustrated elements, processes and devices.

Figure 3:
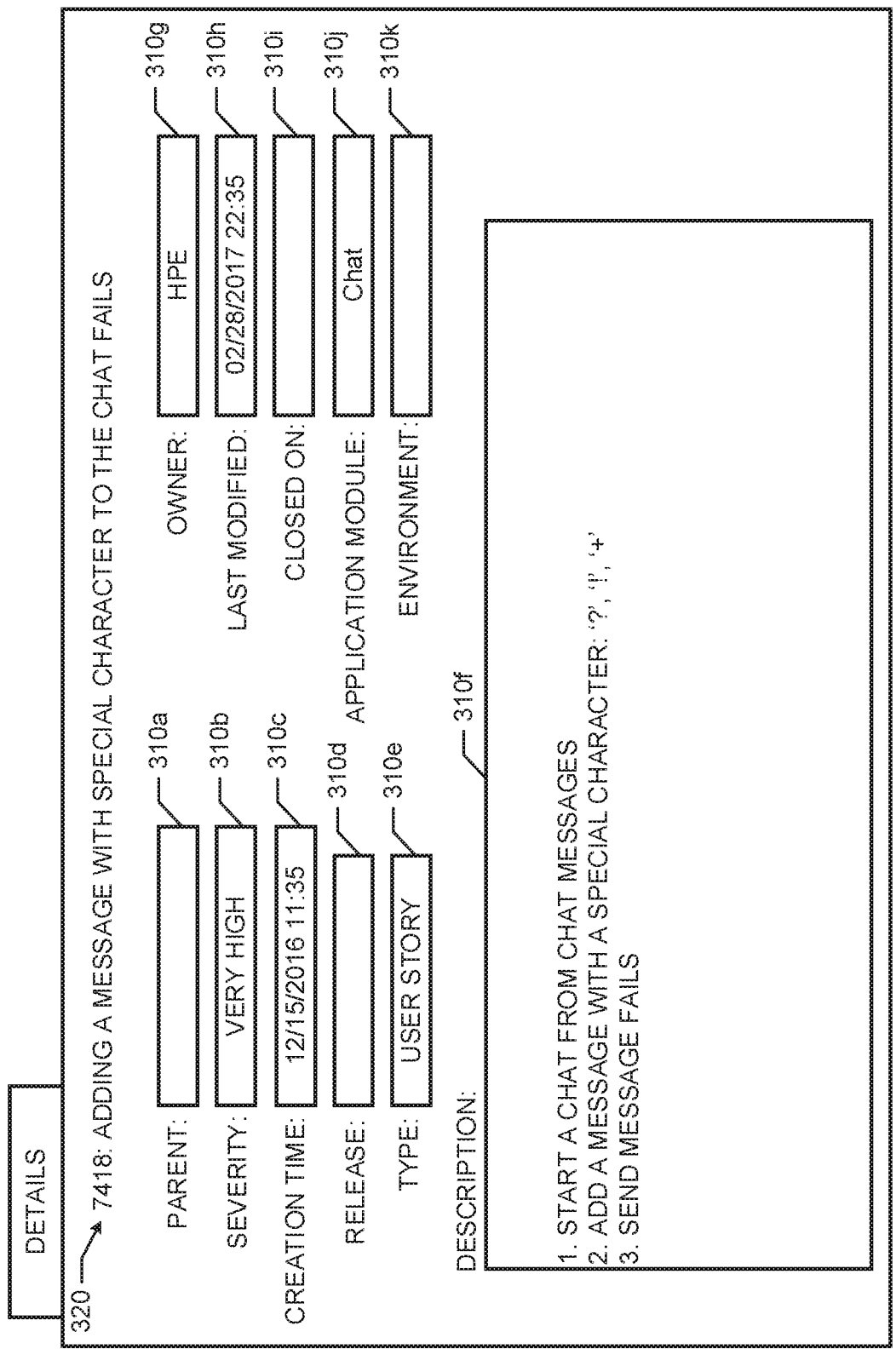
FIG. 3 is an example interface that may be implemented by the application manager of FIG. 1 and used by the dynamic test selector of FIG. 2 in in accordance with an aspect of this disclosure.

FIG. 3 illustrates an example interface 300 that may be implemented by the application manager 110. The example interface 300 of FIG. 3 shows details of a commit including example characteristic fields 310a-310k (which may be referred to herein collectively as fields 310) for a commit identified by the commit identifier 320. The example fields 310 may be populated by a user and/or populated automatically by the application manager 110 based on changes or updates in the commit '7418.' Information from the fields 310 may be stored in a commit repository, such as the commit repository 114 of FIG. 1. Accordingly, in FIG. 1, when a commit is submitted from the commit data generator 120 to the continuous integration system 130 and the application manager 110 from the commit data generator 120, the interface 300 of FIG. 3 may be presented to a user to enter information/characteristics of the commit into the commit repository 114. In some examples, some or all of the fields of the interface 300 may be populated automatically by the application manager 110 based on an analysis of the application code (e.g., by scanning the application code for the characteristics and/or performing a comparison of the application code with a previous version, instance, or state of the application code).

Referring to the example fields 310 of the interface 300 of FIG. 3, the dynamic test selector 112 may analyze information in the commit repository 114 corresponding to the fields 310 to select tests for a commit. For example, the commit analyzer 220 of the dynamic test selector 112 determines that the commit '7418' of FIG. 3 is a 'user story' commit from the Type field 310e and that an area of the commit in the application code is a 'chat' area from the Application Module field 310j. Accordingly, the selection manager 230 may then retrieve tests (e.g., from a test data structure) for a 'user story' commit for the 'chat' application module of the application code. For example, the tests may have been specified for particular types, application modules, etc. for commits, the tests may have been selected for execution for related commits, or the tests may have been designated by a user for particular types, application modules, features, etc. of the commits.

As such, the selection manager 230 makes a dynamic selection of tests specific to the commit '7418' (rather than performing a full set of tests on the commit '7418'). The test indicator 240 may then indicate the selected tests that are to be executed for the commit '7418' of FIG. 3 by the continuous integration system 130. And finally, the continuous integration system 130 may validate the commit '7418' by executing the selected tests via the context-based test manager 132. Accordingly, using the interface 300 of FIG. 3, tests may be selected based on information in the fields 310 to more quickly and efficiently validate a commit than performing a full build of the commit and performing a full set of tests on the commit.

Figure 4:
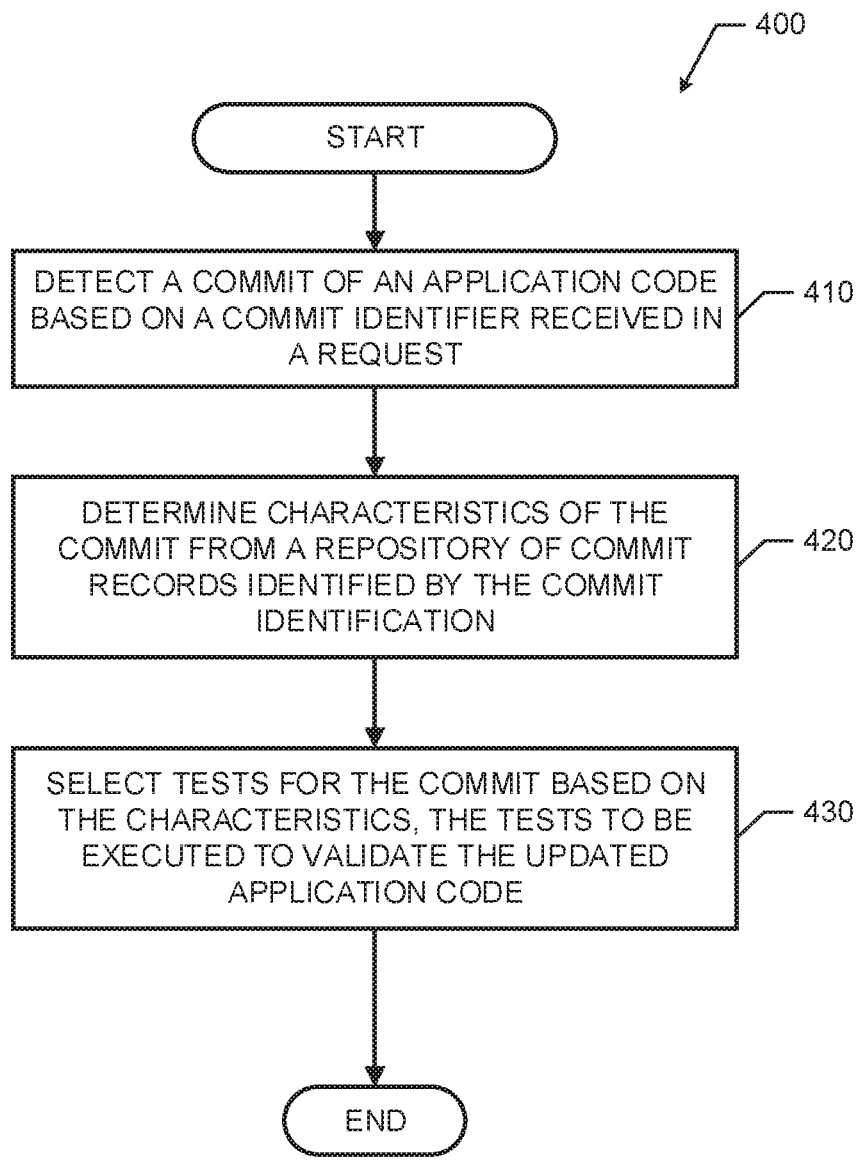
FIG. 4 is a flowchart representative of example machine readable instructions that may be executed to implement the dynamic test selector of FIG. 2.

A flowchart representative of example machine readable instructions for implementing the dynamic test selector 112 of FIG. 2 is shown in FIG. 4. In this example, the machine readable instructions comprise a program/process for execution by a processor such as the processor 612 shown in the example processor platform 600 discussed below in connection with FIG. 6. The program/process may be embodied in executable instructions (e.g., software) stored on a non-transitory machine readable storage medium such as a CD-ROM, a floppy disk, a hard drive, a digital versatile disk (DVD), a Blu-ray disk, or a memory associated with the processor 612, but the entire program/process and/or parts thereof could be executed by a device other than the processor 612 and/or embodied in firmware or dedicated hardware. Further, although the example program is described with reference to the flowchart illustrated in FIG. 4, many other methods of implementing the example dynamic test selector 112 may be used. For example, the order of execution of the blocks may be changed, and/or some of the blocks described may be changed, eliminated, or combined.

The example process 400 of FIG. 4 begins with an initiation of the dynamic test selector 112 (e.g., upon startup, upon instructions from a user, upon startup of a device or system implementing the dynamic test selector 112 (e.g., the application manager 110), upon receiving a request for tests from the continuous integration system 130, etc.). The example process 400 of FIG. 4 may be executed to select appropriate tests to be executed for a commit of an application code based on characteristics of changes in the application code of the commit. At block 410, the commit manager detects a commit of an application code based on a commit identifier in a request (e.g., a request for test to be executed on the commit).

At block 420 of FIG. 2, the commit analyzer 220 determines characteristics of the commit from a repository of commit records identified by the commit identifier. For example, at block 420, may refer to the commit repository 114 and retrieve commit data and/or characteristics of the commit from commit records for the commit. At block 430, the selection manager 230 selects tests for the commit based on the characteristics, such that the selected tests are to be executed (e.g., by the continuous integration system 130) to validate the updated application code.

Figure 5:
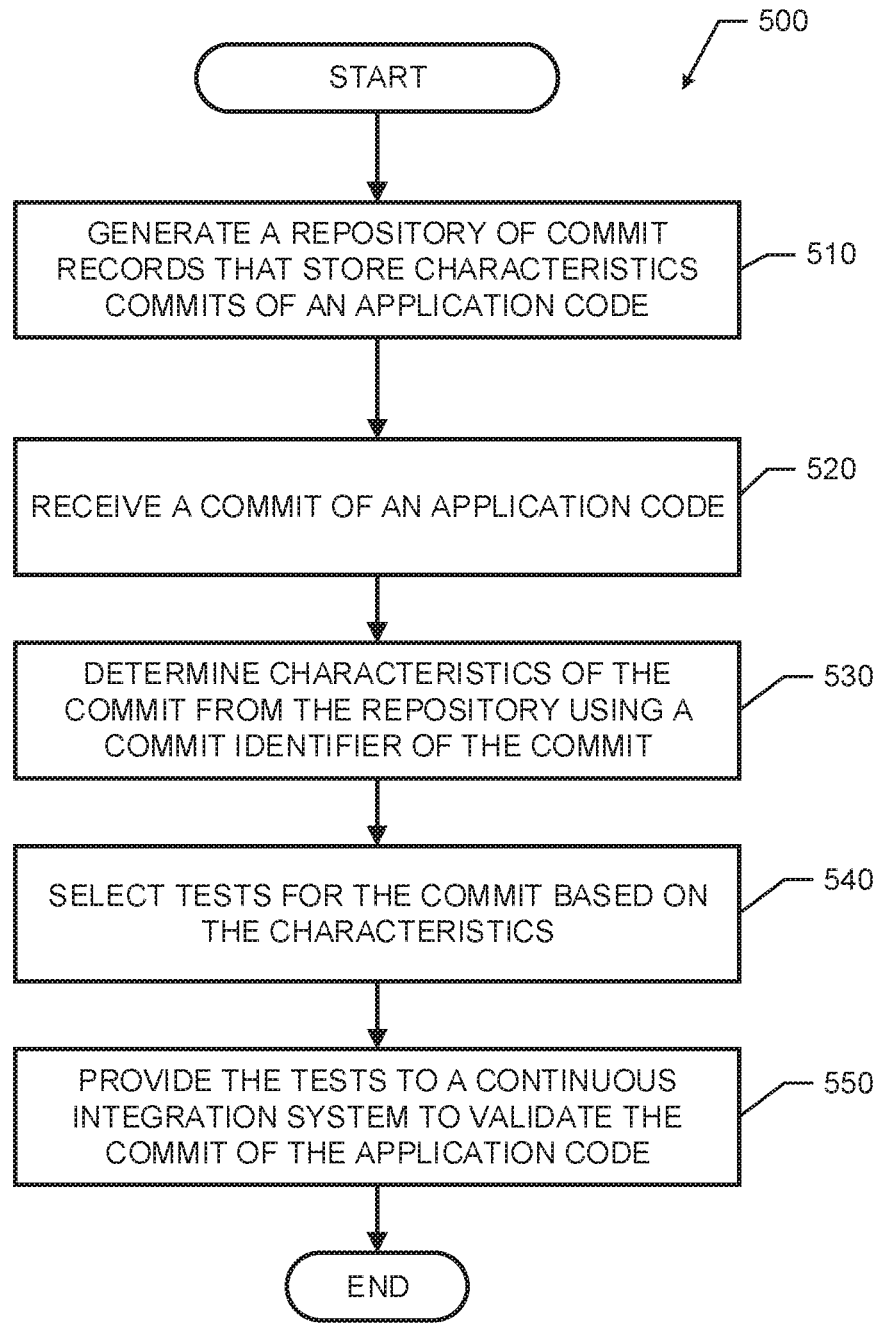
FIG. 5 is a flowchart representative of example machine readable instructions that may be executed to implement the application manager of FIG. 1.

A flowchart representative of example machine readable instructions for implementing the application manager 110 of FIG. 1 is shown in FIG. 5. In this example, the machine readable instructions comprise a program/process for execution by a processor such as the processor 612 shown in the example processor platform 600 discussed below in connection with FIG. 6. The program/process may be embodied in executable instructions (e.g., software) stored on a non-transitory machine readable storage medium such as a CD-ROM, a floppy disk, a hard drive, a digital versatile disk (DVD), a Blu-ray disk, or a memory associated with the processor 612, but the entire program/process and/or parts thereof could be executed by a device other than the processor 612 and/or embodied in firmware or dedicated hardware. Further, although the example program is described with reference to the flowchart illustrated in FIG. 5, many other methods of implementing the example application manager 110 may be used. For example, the order of execution of the blocks may be changed, and/or some of the blocks described may be changed, eliminated, or combined.

The example process 500 of FIG. 5 begins with an initiation of the application manager 110. The example process 500 of FIG. 5 may be executed to dynamically select tests for a commit of an application code without performing a full test or build of the application code. At block 510, the application manager 110 generates a repository of commit records (e.g., the commit repository 114) that store characteristics of commits of an application code.

At block 520 of FIG. 5, the application manager 110 receives a commit of an application code. In some examples, in block 510, a commit record may be added or updated in the commit repository 114 for the commit of the application code. At block 530, the commit analyzer 220 of the dynamic test selector 112 determines characteristics of the commit from the repository using commit identifiers of the commit. At block 540, the selection manager 230 selects tests for the commit based on the characteristics and the test indicator 240 provides the tests to a continuous integration system 130 to validate the commit of the application code at block 550. As such, the continuous integration system 130 may execute the selected tests for the commit based on the characteristics of the commit (e.g., based on changes in the commit, the location of the changes within the application code, and/or the type of commit), rather than executing a full build or full test of the application code to validate the changes in the commit.

As mentioned above, the example processes of FIGS. 4 and/or 5 may be implemented using coded instructions (e.g., computer and/or machine readable instructions) stored on a non-transitory machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 6:
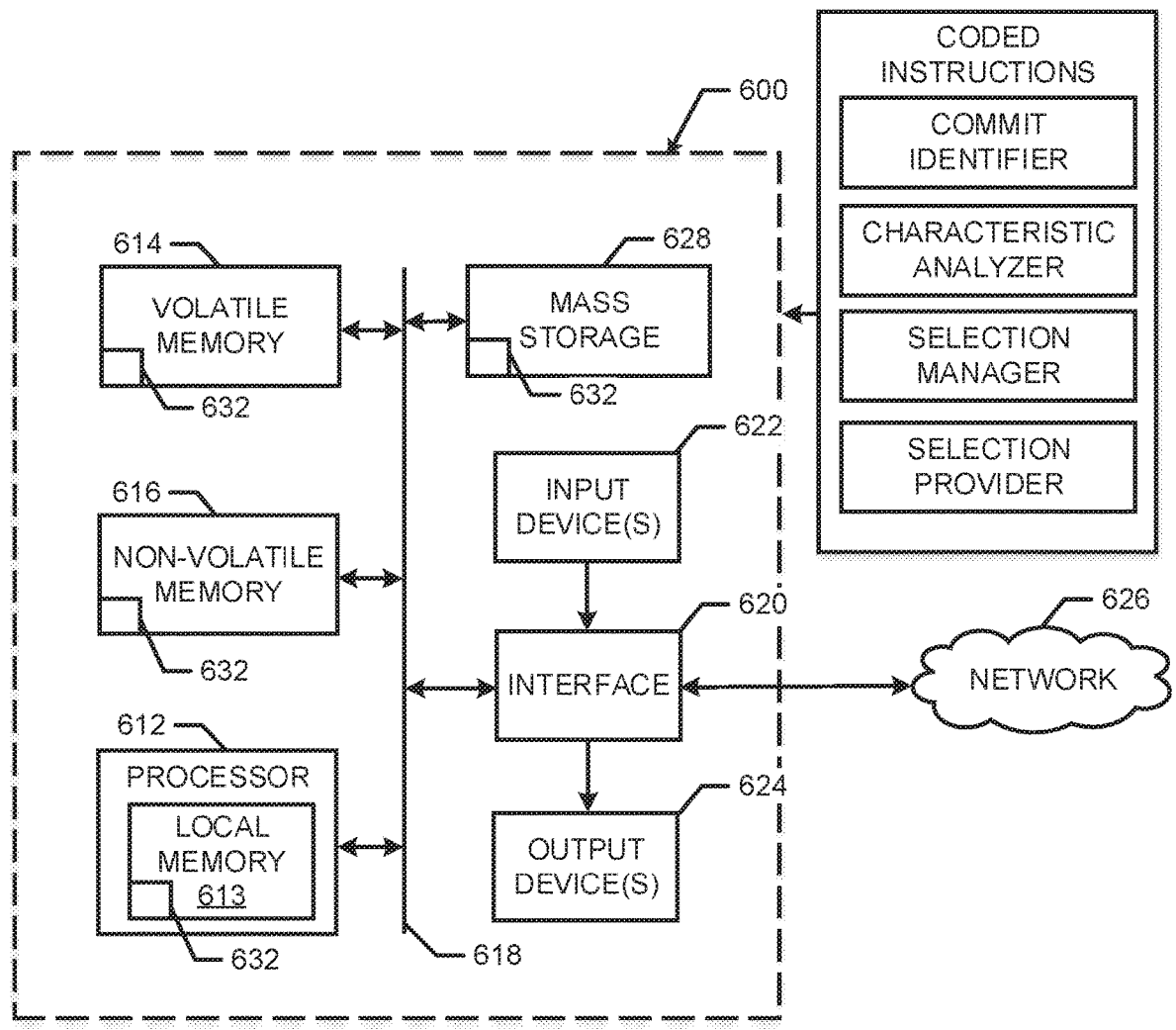
FIG. 6 is a block diagram of an example processor platform capable of executing the instructions of FIGS. 4 and/or 5 to implement the dynamic test selector of FIG. 2 or the application manager of FIG. 1.

FIG. 6 is a block diagram of an example processor platform 600 capable of executing the instructions of FIG. 4 to implement the dynamic test selector 112 of FIG. 2 and/or the instructions of FIG. 5 to implement the application manager 110 of FIG. 1. The example processor platform 600 may be or may be included in any type of apparatus, such as a server, a personal computer, or any other type of computing device.

The processor platform 600 of the illustrated example of FIG. 6 includes a processor 612. The processor 612 of the illustrated example is hardware. For example, the processor 612 can be implemented by at least one integrated circuit, logic circuit, microprocessor or controller from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory, a persistent, byte-addressable memory accessible via a memory fabric and/or any other desired type of non-volatile memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a peripheral component interconnect (PCI) express interface.

In the illustrated example, at least one input device 622 is connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, and/or a voice recognition system.

At least one output device 624 is also connected to the interface circuit 620 of the illustrated example. The output device(s) 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, may include a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes at least one mass storage device 628 for storing executable instructions (e.g., software) and/or data. Examples of such mass storage device(s) 628 include floppy disk drives, hard drive disks, compact disk drives, Blu-ray disk drives, RAID systems, and digital versatile disk (DVD) drives.

The coded instructions 632 of FIGS. 4 and/or 5 may be stored in the mass storage device 628, in the local memory 613 in the volatile memory 614, in the non-volatile memory 616, and/or on a removable tangible machine readable storage medium such as a CD or DVD.

The above disclosed methods, apparatus and articles of manufacture enable a dynamic selection of tests to be run on commits of an application code based on characteristics of the commit, including the location of changes in the application code of the commit, the type of the commit, the test history of the commit, etc. Accordingly, the application code may be validated using the selected tests without performing a full build or test of the application. As such, testing the commit can be performed in less time as less tests are executed to validate the code without sacrificing quality of the tests as the tests can be dynamically selected based on the specific updates, changes, type of commit, and test history of the commit.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   in response to receiving a request for a selection of tests for testing a commit of an updated application code, detecting a commit identifier of the commit in the request;
   retrieving characteristics of the commit from a repository of commit records using the detected commit identifier, wherein the characteristics of the commit identify a portion of the updated application code that was changed or updated;
   selecting the tests for testing the commit based on content of the portion of the updated application code that was changed or updated; and
   providing the selected tests to a continuous integration system, wherein the selected tests are to be executed by the continuous integration system to validate the commit of the updated application code.

2. The method as defined in claim 1, further comprising:
   analyzing related commits of the commit; and
   selecting the tests for testing the commit further based on features of the related commits or tests executed for the related commits.

3. The method as defined in claim 1, further comprising:
   recording the characteristics of the commit in the repository based on user input associated with the commit.

4. The method as defined in claim 1, wherein the characteristics of the commit and the portion of the updated application code that was changed or updated are stored in the repository based on user input in fields of information on a user interface.

5. The method as defined in claim 1, wherein the portion of the updated application code that was changed or updated is relative to a previous commit of the updated application code.

6. The method as defined in claim 1, further comprising:
   determining that the commit identifier is associated with a user story or a defect based on the commit identifier; and
   identifying the characteristics of the commit based on the user story or the defect.

7. The method as defined in claim 1, further comprising:
   storing result data associated with the selected tests; and
   selecting tests for a subsequent commit related to the commit based on the result data.

8. A non-transitory machine readable storage medium comprising instructions that, when executed, cause a machine to at least:
   generate a repository of commit records that store characteristics of commits of an application code;
   receive a request for a selection of tests for testing one of the commits of the application code;
   in response to receiving the request, detect a commit identifier of the commit in the request;
   retrieve characteristics of the commit from the repository using the detected commit identifier of the commit, wherein the characteristics of the commit identify a portion of the application code that was changed or updated;

select the tests for testing the commit based on content of the portion of the application code that was changed or updated; and provide the selected tests to a continuous integration system, wherein the selected tests are to be executed by the continuous integration system to validate the commit of the application code.

9. The non-transitory machine readable medium of claim 8, wherein the request for the selection of the tests is received from the continuous integration system.

10. The non-transitory machine readable medium of claim 8, wherein the instructions, when executed, further cause the machine to:

analyze related commits of the commit; and select the tests for testing the commit further based on features of the related commits or tests executed for the related commits.

11. The non-transitory machine readable medium of claim 8, wherein the instructions, when executed, further cause the machine to:

present a user interface to enable a user to input the characteristics of the commit; and store the characteristics input by the user in the repository.

12. The non-transitory machine readable medium of claim 8, wherein the instructions, when executed, further cause the machine to:

store result data for the selected tests received from the continuous integration system in the repository;

receive a subsequent commit; and select subsequent tests for the subsequent commit based on the result data for the selected tests.

13. The non-transitory machine readable medium of claim 12, wherein the result data comprises at least one of results of the tests, user feedback from the tests, or errors detected from the tests.

14. The non-transitory machine readable medium of claim 8, wherein the instructions, when executed, further cause the machine to:

determine the characteristics of the commit based on characteristics of related commits in the repository.

15. An apparatus comprising:

a processor; and a non-transitory machine readable storage medium storing instructions that, when executed by the processor, cause the processor to:

receive a request for a selection of tests for testing a commit for an application code, the commit identified by a commit identifier;

in response to receiving the request, detect the commit identifier of the commit in the request;

retrieve characteristics of the commit from a repository of commit records for the application code using the detected commit identifier, wherein the characteristics of the commit identify a portion of the application code that was changed or updated;

select the tests for testing the commit based on content of the portion of the application code that was changed or updated; and provide the selected tests to a continuous integration system, wherein the selected tests are to be executed by the continuous integration system to validate the commit of the application code.

16. The apparatus of claim 15, wherein the request for the selection of the tests is received from the continuous integration system.

17. The apparatus of claim 15, wherein the instructions are executable to cause the processor to:

identify commit records of related commits of the commit in the repository based on features of the commit, wherein the commit records of the related commits comprise the characteristics of the commit.

18. The apparatus of claim 17, wherein the features of the commit comprise a particular area of the application code or a type of the commit.

19. The apparatus of claim 15, wherein the instructions are executable to cause the processor to:

receive results data of the selected tests from the continuous integration system; and store the results data in the repository, the results data to be used for test selection for a subsequent commit.

20. The apparatus of claim 15, wherein the instructions are executable to cause the processor to:

receive the characteristics of the commit and information of the commit based on user input; and store the characteristics of the commit and the information of the commit in the repository.

* * * * *